United States Patent [19]

Hart

[11] 4,090,175

[45] May 16, 1978

[54] OPTO-ELECTRONIC LOCK DEVICE

[76] Inventor: Robert Lee Hart, 1525 Olive St., Indianapolis, Ind. 46203

[21] Appl. No.: 765,854

[22] Filed: Feb. 4, 1977

Related U.S. Application Data

[63] Continuation-in-part of Ser. No. 681,555, Apr. 29, 1976, abandoned.

[51] Int. Cl.[2] .................................................. H04Q 3/00

[52] U.S. Cl. ............................ 340/164 R; 340/149 A; 340/274 C; 340/149 R; 70/363

[58] Field of Search ......... 70/363; 340/149 A, 274 C, 340/164 R

[56] References Cited

U.S. PATENT DOCUMENTS

| | | | |
|---|---|---|---|
| 2,036,738 | 4/1936 | Zygmunt | 70/363 |
| 2,618,957 | 11/1952 | Tonnessen | 70/363 |
| 2,772,557 | 12/1956 | Audicio | 70/363 |
| 3,500,326 | 3/1970 | Benford | 340/274 C |
| 3,688,269 | 8/1972 | Miller | 340/149 A |
| 3,786,471 | 1/1974 | Hochman | 340/149 A |
| 3,893,314 | 7/1975 | Raymond | 70/363 |

*Primary Examiner*—Harold I. Pitts

*Attorney, Agent, or Firm*—Woodard, Weikart, Emhardt & Naughton

[57] ABSTRACT

An opto-electronic, key-operated lock device means which provides a connection for one or more opto-electric circuits (control circuits employing light and logic for control of electrical circuits) as an incident to the insertion and operation therein of the proper key. The proper key is encoded for completion of predetermined light paths to photosensors coupled to decoder logic circuits for establishment and disestablishment of the opto-electrical circuits coincident with the use of the proper key.

10 Claims, 11 Drawing Figures

OPTO-ELECTRONIC LOCK DEVICE

CROSS-REFERENCE TO RELATED APPLICATIONS

This application is a continuation-in-part of my application Ser. No. 681,555, filed Apr. 29, 1976, now abandoned.

BACKGROUND OF THE INVENTION

1. Field of the Invention

This invention relates to thief-resistant lock devices, as for vehicles, buildings, vaults, deposit boxes, or any application requiring locking devices for security and electrical interlock for safety or warning.

2. Description of the Prior Art

Considerable prior art is known relating to locking systems and alarm systems. Some prior art noted in the course of a search on this subject is as follows:

U.S. Pat. No. 3,029,345 Douglas
U.S. Pat. No. 3,599,454 Hill et, al.
U.S. Pat. No. 3,639,906 Tritsch
U.S. Pat. No. 3,660,831 Nicola et, al.
U.S. Pat. No. 3,733,862 Killmeyer
U.S. Pat. No. 3,889,501 Fort IBM Technical Disclosure Bulletin, Vol. 12, p. 1473

In the Douglas patent, there is a disclosure of a "key-card" in which the light-transmitting characteristics of the card, if correct, will enable activation of a door-opening circuit.

In the Hill et al patent, a special key is provided such as shown in FIGS. 8–14 and 16–19, and which must first be inserted in a reading station, and then be inserted in a lock. Holes or cavities in the key, and associated "micro"-switches, control the lock.

In the Tritsch patent, key-operated pins complete light paths. In FIG. 5, the key has embedded magnets for operating reed switches.

In the Killmeyer reference, there is a combination mechanical and light-actuated lock whereby rotation of a notched key in the tumbler cylinder permits the intersection of a light path by coded apertures which generate a characteristic pattern.

In the Fort patent, lock mechanisms using a pair of light sources and detectors and an apertured key are disclosed. When the key is inserted, light is permitted to pass therethrough whereby an electrical circuit is operated which, in turn, activates a solenoid to permit rotation of the mechanical cyclinder.

In Nicola et al, column 1 speaks of a motor vehicle alarm and column 5 speaks of a false key alarm. The key uses conductive contacts on the surface, to make electrical connections.

In the IBM Technical Disclosure Bulletin, a light-operated lock includes a "micro"-switch 6 for actuating the system when the key is inserted, and alarm means which are actuated if the inserted key is not the correct one.

Three additional references were cited in the original application Ser. No. 681,555. In these, U.S. Pat. No. 3,906,447 discloses the idea of applying the system to an automobile ignition lock. The key itself is simply a card having a particular code arrangement on it and does not have mechanical operating features. Similarly, the opto-electronic security system of the Cestaro U.S. Pat. No. 3,872,435 does not have a key with mechanical features on it for mechanical operations in a lock. The key itself has pulse-train generating means on it.

The Benford U.S. Pat. No. 3,500,326 uses the lugs on the key of FIG. 2 or the combination of lugs and features in the slot of the key of FIG. 15 to operate switches, In contrast, the programmer of FIGS. 12 and 13 can respond to holes in two rows for producing the pulse patterns to operate the apparatus.

I believe there remains a need for locking apparatus of comparatively simple construction and having some features to which the general public is accustomed, while combining new mechanical and optical-electronic locking and alarm features, together with minimal likelihood of susceptibility to decoding or "picking" by unauthorized persons.

SUMMARY OF THE INVENTION

Described briefly, in a typical embodiment of the present invention, a lock cylinder in a housing is provided with a plurality of transverse light-transmitting apertures therein. A keyway perpendicular to the path of light through the apertures extends throughout most of the length of the cylinder. At the end of the keyway and extending longitudinally to the end of the cylinder opposite the keyway are pins operable by a key inserted in the keyway to enable turning the lock cylinder to a position whereupon, if a correct key in terms of mechanical features is employed, it can then turn the lock and, if the opto-electronic circuitry indicates that it is the correct key, then the unlocking function will be achieved. If it is an incorrect key, an alarm will be sounded.

BRIEF DESCRIPTION OF THE DRAWINGS

FIG. 1 further shows a side view thereof.

FIG. 1 further shows a rear end view thereof.

Figure 1:
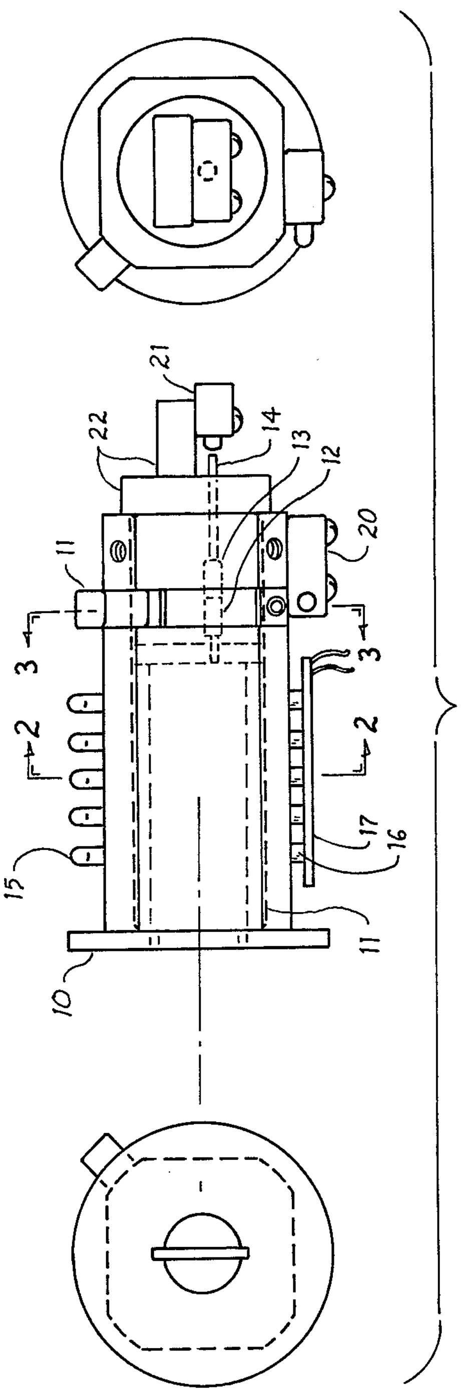
FIG. 1 shows a front view of a lock assembly according to a typical embodiment of the present invention.

Generally speaking, the system is operated by a key having the identifiable key notches not on the length as customarily seen, but on the end and containing a series of holes in its flat length. The holes are provided for a light path, which conducts light energy to phototransistors. The light path is conducted through light pipe from its source — a small bulb to one side of the key. The holes in the key allow light energy to selectively pass through to the phototransistors. The phototransistor turns on an electrical signal in the presence of light energy. This signal is conducted to an electronic "logic gate". The logic gate is a device to provide multiple paths for a signal to travel. When the proper combination of signals is received from the phototransistors, the gates are opened and the signal travels through the logic maze to operate the locked device. If an improper signal is received, another series of gates is opened in the logic maze and the alarm is sounded or activated.

DESCRIPTION OF THE PREFERRED EMBODIMENT

Referring now to the drawings in detail, a lock housing block 10 is a generally elongated body with a flange at the front (outer) end. A key cylinder 11 is mounted in the block for rotation on its cylindrical axis. It contains a plurality of locator pins 12 to locate lock pins 13 and a switch actuator pin 14 as will be described in more detail. Light pipes 15 such as shown in the above-mentioned Tritsch U.S. Pat. No. 3,639,906 are connected to the left-hand side of the housing 10 to supply light to selected passageways in the lock assembly. Light-responsive electrical conductor devices 16 are mounted. in the right-hand side of the housing and connected to a circuit board 17. A return spring 18 (FIG. 3) is received in a cavity in the housing for a purpose to be described. Key 19 is shown in the keyway in the key cylinder in FIG. 2. Switches 20 and 21 are secured to the assembly. These are of the short motion snap-action type sometimes commonly referred to as "micro-switches", such as are manufactured by the Micro Switch Division of Honeywell, Inc., of Freeport, Illinois. A support member 22 is secured to the housing and switch 21 is connected thereto by the bracket 23 connected to the support member 22.

Figure 4:
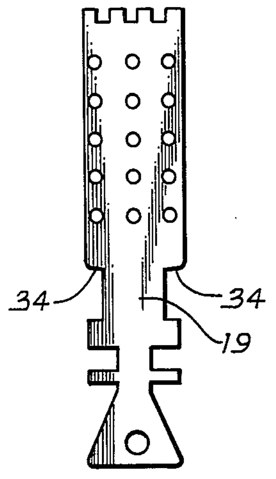
FIG. 4 is a face view of a key according to a typical embodiment of the present invention.
Figure 6:
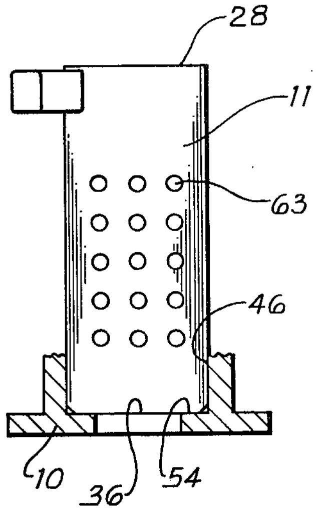
FIG. 6 is a view of the key cylinder looking in the same direction as in FIG. 1B, and showing in section a portion of the lock housing at the keyway entrance opening.
Figure 8:
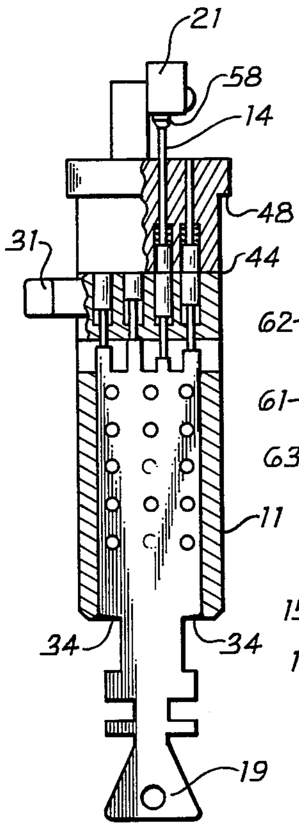
FIG. 8 is a section like FIG. 7, but showing the correct key inserted in the key cylinder and thereby moving the lock pins out of locking relationship, portions of the key cylinder and the switch actuator support being shown solid.
Figure 9:
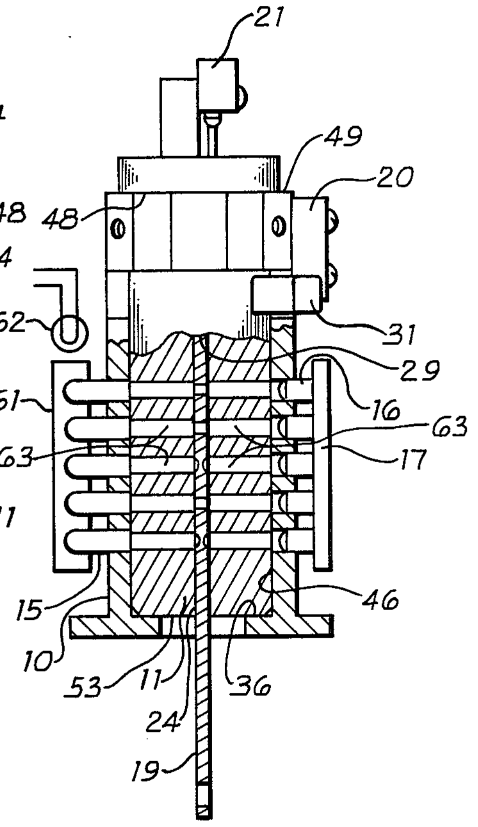
FIG. 9 is a view from the same aspect as FIG. 1B but showing a portion of the housing and key cylinder in section taken at the same plane as in FIG. 8, but showing the key cylinder rotated to the unlocked position.
Figure 5:
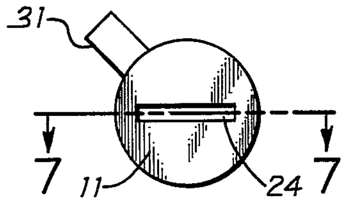
FIG. 5 is an outer (key slot opening) end of the key cylinder of the lock.

Referring now to FIG. 5, the appearance of the key cylinder 11 from the front or outer end is shown. The key slot opening 24 is the entrance to the keyway 26 (FIG. 7) which extends towards the inner end 28 of the key cylinder and terminates at the wall 29. As shown in FIG. 9, the slot form of the keyway extends and continues throughout its entire length. The key cylinder has a lug 31 projecting radially outward near the rear end. In all of the except FIG. 9, the cylinder is shown in the locked position. The unlocked position is at 90° therefrom with respect to the cylindrical axis, and is shown in FIG. 9. In the unlocked position of the cylinder, the key is retained in position abutting the bottom or inner end of the end of the keyway by engagement of the shoulders 34 of the key (FIGS. 4 and 8) with the inside face 36 of the front of the housing 10 at locations 37 (FIG. 1A) 90° around from the notches 38 in the circular edge 39 of the keyway opening in the housing. The key can be withdrawn from the keyway only when the key cylinder is in the position shown in FIGS. 1–8 whereupon the shoulders 34 can pass through the notches 38 for removal and/or entrance of the key.

Figure 7:
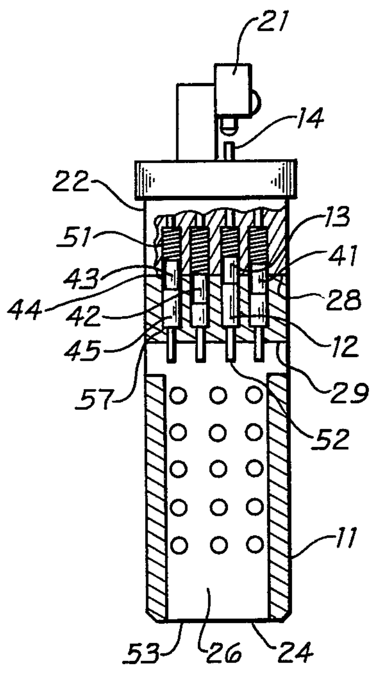
FIG. 7 is a section through the key cylinder and switch actuator support taken at line 7—7 in FIG. 5 and viewed in the direction of the arrows.

Locator 12, lock pin 13, and switch actuator pin 14 have been previously mentioned. They are shown both in FIGS. 1B, 7, and 8. Additional lock pins 41, 42, and 43 are shown in FIG. 7. All four of these lock pins are located in longitudinally extending holes in both the key cylinder 11 and the support member 22. Since they extend across the plane 44 of the abutting lower and upper faces of the member 22 and key cylinder 11, respectively, the key cylinder is locked. It is locked because the support member 22 is affixed in the inner end of the housing bore 46 which receives the keyway cylinder and the support member. A pair of setscrews 47 (FIG. 1B) threadedly received in the housing affix the member 22 in this position with the shoulder 48 of member 42 abutting the inner end 49 of the housing.

The lock pins are urged toward the key cylinder by coil springs such as 51 seated in the upper end of the lock pin pockets in the support, and having their lower ends engaging the upper ends of the lock pins. The switch actuator pin 14 is encircled by the particular coil spring engaging its respective lock pin 13, and the lower end of pin 14 engages the upper end of the lock pin 13. It should be understood that the terms "lower" and "upper" are used with reference to the particular illustrations for convenience of expression. However, the lock can be oriented and operable in any attitude. The downward travel of the lock pins is limited by the upper ends of the locator pins such as 12. It may be observed in the drawing that all of the lock pins are of the same overall length. In contrast, the locator pins are of varying length. This enables the lower ends of the locator pin stems such as 52 to all be at the same distance from the keyway entrance 24 at the outer end 53 of the cylinder. This end of the key cylinder is borne by the inner face 54 of the lock housing, including the circular marginal portion 36 which retains the key in the housing once it has been rotated from the lock position toward the unlock position. So it is seen that the head portions of the locator pins are of different lengths, e.g, 12 and 45; whereas the stem portions are all of the same length and thus project from the locator pin seats such as 57 in the bottom of the locator pin tubes or holes in the key cylinder a uniform length into the keyway.

In order to unlock the key cylinder, all of the lock pins must be pushed upward so that the lower ends thereof are in abutting relation with the upper ends of the locator pins in the common plane of abutment of the key cylinder with the support 22. This condition is shown in FIG. 8. When this occurs, the key can be turned to the position shown in FIG. 9. At the same time, the lock pin 13 has pushed actuator pin 14 upward into engagement with the operator button 58 of switch 21 to operate that switch. The inner (upper) end 28 of the key cylinder is smooth throughout its area except for where the four pin holes are provided therein. Therefore, as soon as it is turned out of alignment with the four lock pin holes in the support 22, the lock pins will be retained in their unlock position by the smooth upper face of the key cylinder. Accordingly, the switch 21 will remain actuated until such time as the key cylinder is returned to the locked position.

Figure 2:
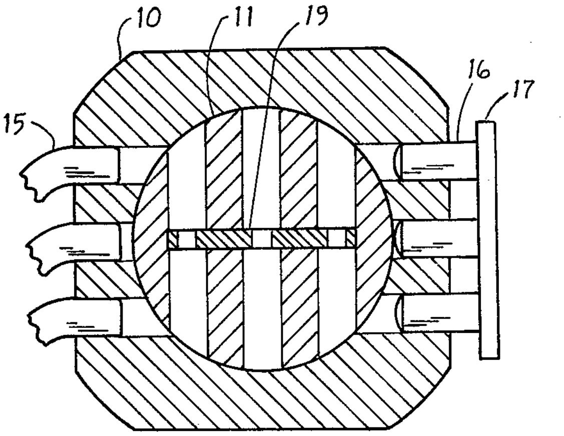
FIG. 2 is a section through the lock assembly taken at line 2—2 in FIG. 1B and viewed in the direction of the arrows.

The light pipes 15 have already been mentioned. They may be joined to a block 61 of the same material illuminated by lamp 62 in somewhat the same manner as disclosed in the previously mentioned Tritsch patent. There can be as many as 15 of these light pipes in the illustrated example, each of them being received in a corresponding aperture in the wall of the lock housing. Likewise there may be as many as 15 light passageways 63 in the key housing extending transverse to the length of the housing. These are disposed perpendicular to the flat dimension of the keyway as is best shown in FIG. 2. Accordingly, if there is no key in the passageway, and if the lamp was illuminated, light could be transmitted from the light pipe through the 15 passageways in the key cylinder to the apertures in the opposite wall of the housing and in which photoresponsive conductive devices 16 are shown in FIG. 2. In FIG. 9, four such photoresponsive conductive devices are shown in four of the five apertures. It should be recognized that there are likewise 15 apertures in the right-hand wall of the housing to accommodate as many as 15 such devices. For most purposes, there is need for only a few such devices as will become apparent. It should be noted and understood at this point that the specific construction and mounting of of features may differ. For example, an insulative board could be mounted in the right-hand portion of the housing and receive the light-responsive, electrically-conductive devices therein. Means other than a single lamp could be employed to supply light energy to the light pipes.

Figure 3:
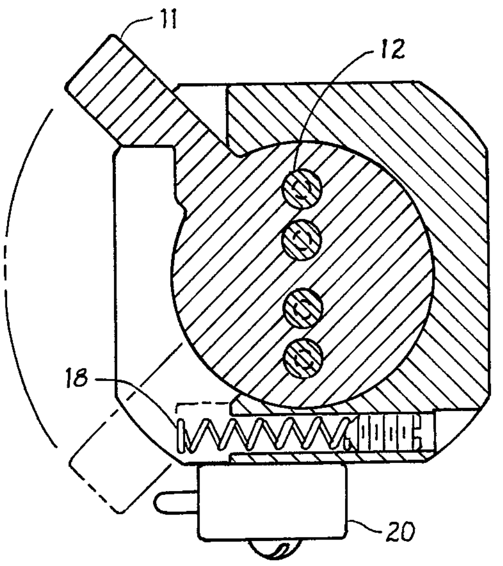
FIG. 3 is a section taken at line 3—3 in FIG. 1B and viewed in the direction of the arrows, but turned 90° with respect to the lock axis in the direction of the arrow 33 in FIG. 3.

Referring specifically to FIG. 3, there is shown a notch 66 in the lug 31. This is for perpendicular engagement of the edge thereof with the end of spring 18 when the lug is in the unlocked position such as for engagement with the operating pin 67 of the switch 20. It will be seen that the lock of the present invention is readily adapted to a variety of uses. Some such uses may dictate that the lock be capable of rotation slightly beyond the immediate opening position in order to activate a switch, and then be spring-returned to the normal open position. The arrangement of FIG. 3 provides this possibiity. In other words, if the dotted line position indicated by numeral 31A for the lug indicates the normal unlock position, further rotation of the lock cylinder by the key in a direction opposite arrow 33 will cause the lug to engage the pin 67 to operate switch 20. This could be used to energize a solenoid to shift a lock bolt or latch strike, or to energize an engine starter motor. For purposes of the subsequent description of FIG. 10, however, it will be assumed that the key cylinder is in the unlock position when disposed as shown in FIGS. 3 and 9 and that, in such position, the lug 31 engages an operating pin of the switch 20 so that switch 20 is activated, as well as switch 21 which was already activated when the correct key was fully inserted in the keyway. Also for this description it should be understood that there is no rotational force being exerted on the key cylinder in a direction tending to return it from the unlocked position to the locked position.

Figure 10:
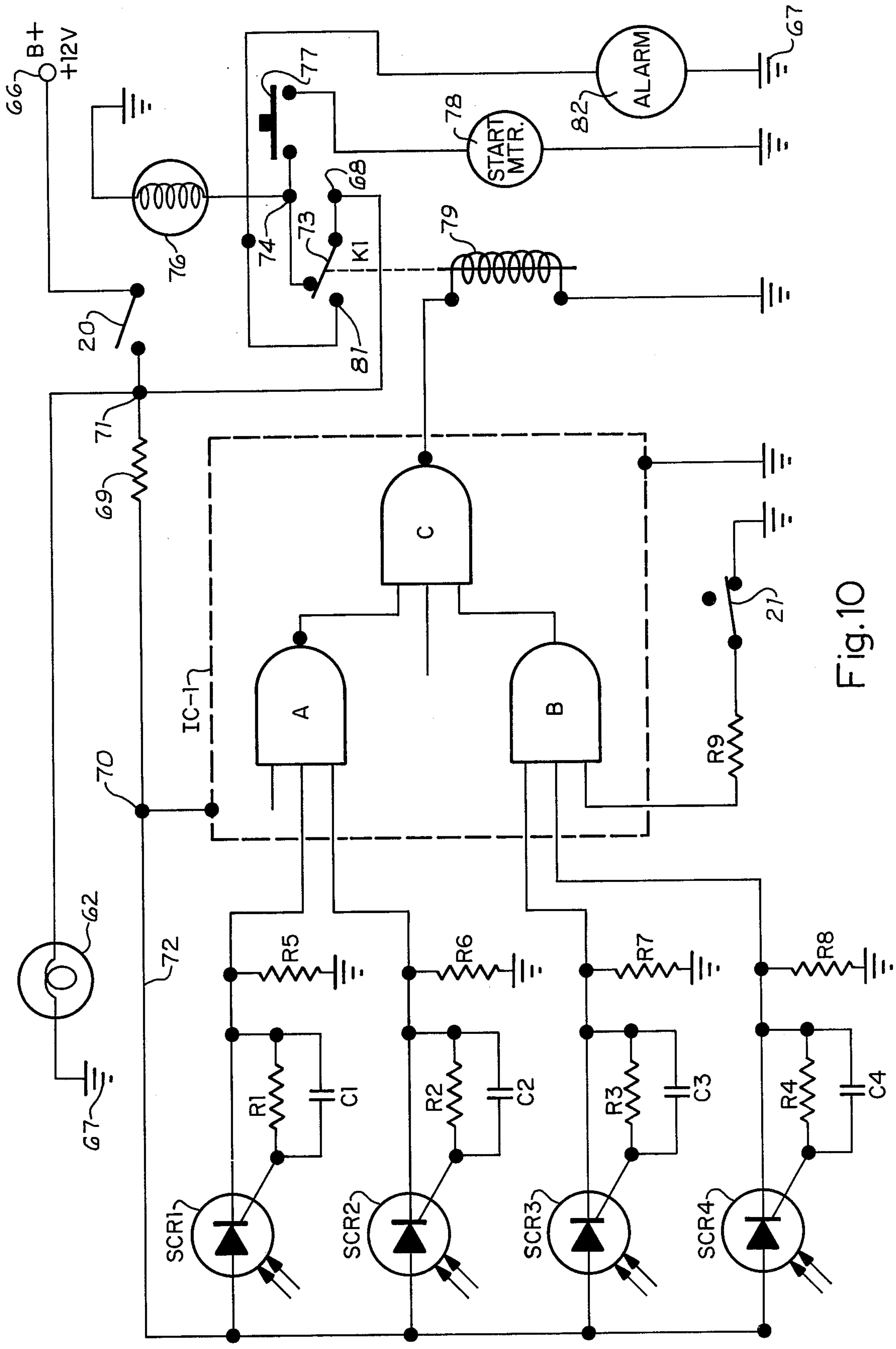
FIG. 10 is an electrical schematic diagram of a system employing a lock according to one embodiment of the present invention.

Referring now to FIG. 10, there is shown a schematic diagram of circuitry which can be used with the lock assembly according to a typical embodiment of this invention. In that figure, a B+ is supplied at terminal 66. This may be 12 volts direct current, for example. 12-volt lamp 62 is shown connected in series with normally-open switch 20 between the input terminal 66 and ground 67, and is energized when the lug 31 is turned to the FIG. 9 position and closes switch 20. Switch 20 also then supplies the terminal 68 of relay K1. A current-limiting resistor 69 is connected between the junctions 70 and 71 so that the appropriate voltage of approximately five volts is applied from switch 20, when closed, to the gating circuit block IC-1 and through conductor 72 to the photoactivated silicon-controlled rectifiers SCR1–SCR4. These rectifiers are in a normally nonconductive state until illuminated.

The gating may be as illustrated in the solid lines within the dotted outline. When the inputs to any of the input terminals of the two NAND gates A and C are down (ground potential), a positive output potential will be applied from the respective gate. Therefore, if any of the input terminals to the gate A or C has ground potential thereon, the output will be high or at five volt potential. If any of the inputs to AND gate B is at ground potential, the output will be at ground potential. If both of the inputs to A or C are up, the outputs of the respective gates will be down. If all three of the inputs to gate B are up, the output will be up. Accordingly, with this arrangement of logic gates, if neither SCR1 nor SCR2 is illuminated, and if SCR3 and SCR4 are illuminated and switch 21 has been opened by the causing switch button 58 to be pushed, by lug 31, then the output from gate C will be down and the relay will remain in the position shown, whereupon the B+ energy from terminal 68 will be conducted through movable contactor 73 to the output terminal 74. This may be connected through an engine ignition coil primary circuit 76 to ground, and to one side of a pushbutton starter switch 77, the other side of which is connected to a starter motor 78 which is returned to ground. It should be understood that utilization devices other than ignition circuits or starter relays might also be energized by switch 20, so long as coil 79 of relay K-1 is not energized.

With the same gating arrangement, if both SCR1 and SCR2 are illuminated, output of NAND gate A will be down, causing the output of NAND gate C to be up, energizing the relay solenoid 79. This will cause the relay movable contact to move to contact point 81 and energize the alarm.

Similarly, if neither SCR3 nor SCR4 is illuminated, or if the key failed to open switch 21, the output of AND gate B will be down, resulting in the output of NAND gate C being up to energize the relay and sound the alarm.

From the foregoing it will be seen that various combinations of locations of the photo SCR's in four of the 15 holes available in the housing, with corresponding hole and blank combinations in the key, will provide the desired results of recognizing whether or not the key is correct, energizing the utilization device if it is the correct key, and energizing the alarm if it's not the correct key.

It may be recognized also that a convenient device for the gating would be a triple 3-input positive NAND gate integrated circuit of the 7410 variety. The combination of switch operation by the key, and lighting or occluding of the SCR's to obtain the correct desired operation, may need to be changed slightly from that described immediately above in order to utilize the NAND gate of such an integrated circuit chip instead of the AND gate B described above.

Figure 11:
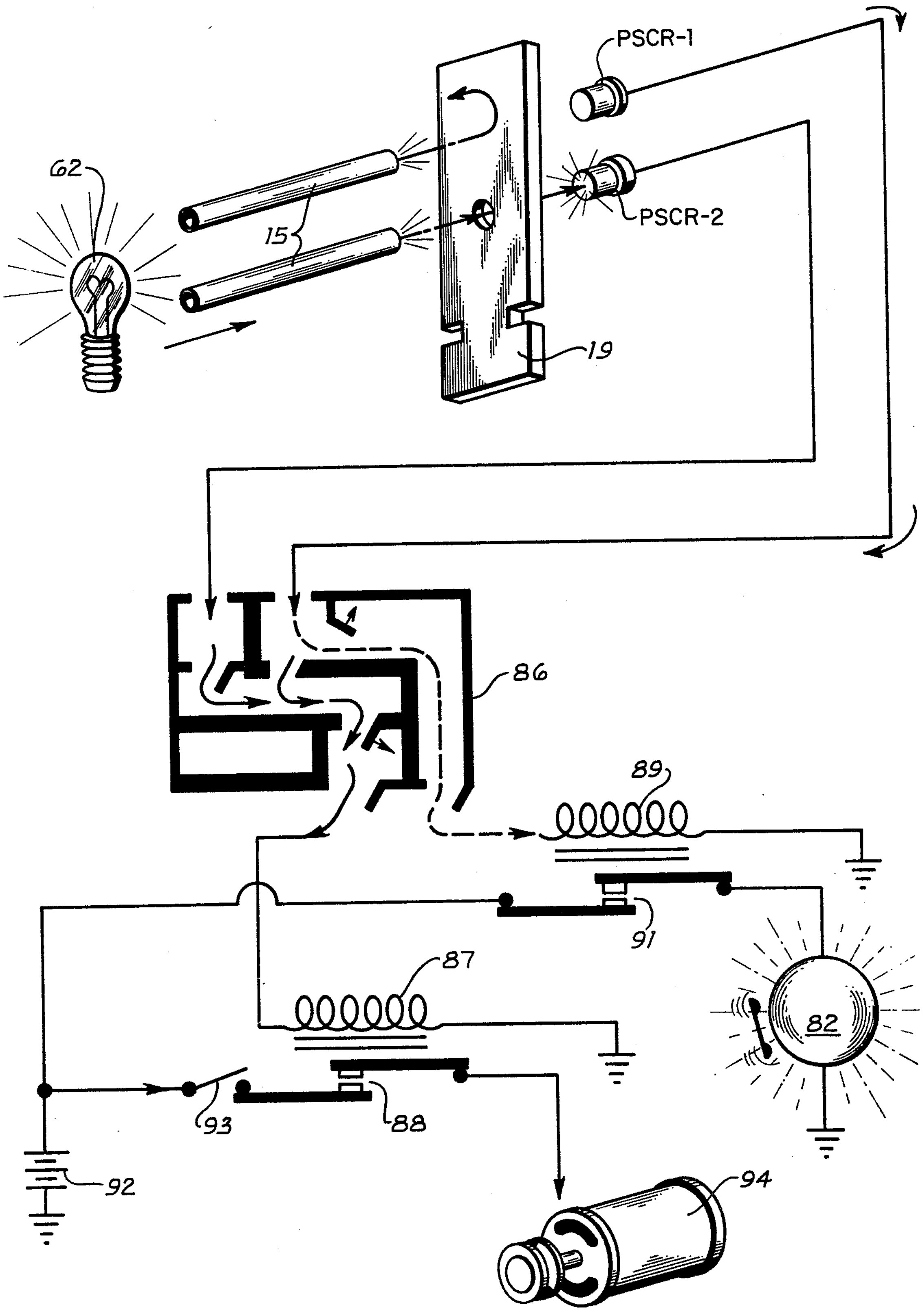
FIG. 11 is an illustrative drawing of a system incorporating the locking device according to another embodiment of the present invention.

Referring now to FIG. 11, which is an illustrative drawing, the lamp 62 is shown in position to transmit light through light pipes 15 toward phototransistors or photo SCR's PSCR1 and PSCR2. The electronic logic gate arrrangement represented at 86 is capable of energizing the coil 87 for relay 88 in the event the phototransistors do not detect a signal indicative of the wrong key. On the other hand, if they detect a signal indicative of the wrong key, the coil 89 for relay 91 will be energized to close the contacts thereof and energize the alarm 82. When the contacts of relay 88 are closed, power derived from battery 92 can be applied through a switch 93 to a contact of relay 88 to thereby energize a motor 94 or other control device such as a solenoid, for example. This could be a garage door opener motor, or a vault door drive motor, or a lock strike solenoid, or any of a variety of other utilization devices.

Where the photoresponsive conductive devices are such as the above-mentioned photoSCR's or phototransistors, they will not produce a signal or permit transmission of a signal in the absence of light. Thus, as shown where the light from the upper light pipe is occluded from the device PSCR1 by the blank or filled aperture in the key, no signal will be transmitted. On the other hand, where the light from the lower pipe is transmitted through the corresponding aperture of the key in registry with the device PSCR2, the device will transmit a signal to the gate. As described above, the particular nature of the gates to respond in the desired manner to the presence or absence of a voltage, can be selected in accordance with the most feasible circuit designs, readily available components, and particular combinations of photoconductive device locations and the like.

Although the key for the illustrated lock may have 15 holes or indentations as shown in FIG. 4, it may have merely indentations at some of the 15 positions as shown for the key of FIG. 8 and FIG. 9 where there are shown holes at thirteen of the locations (FIG. 8), three of them appearing in FIG. 9, and indentations at two locations, both showing in FIG. 9.

Modifications and variations may be effected without departing from the scope of the novel concepts of the invention. Accordingly, the invention is not limited to the specific form or arrangement of parts herein described or shown.

What is claimed is:

1. A lock comprising:

a lock housing having a key opening in it;

a key cylinder received in said housing and rotatable on its cylindrical axis in said housing from a lock position to an unlock position, said cylinder having an axially-extending keyway therein facing said opening and extending from an outer end of said cylinder toward an inner end of said cylinder;

a support secured to said housing in alignment with the inner end of said cylinder;

a plurality of cylinder lock pins in said support and movable therein parallel to said axis;

pin-loading means in said support and urging said pins axially into pin-receiving apertures in said cylinder;

a plurality of lock pin locators in said apertures and seated in said cylinder and having front ends exposed in said keyway and rear ends supporting said lock pins against said urging, said locators being of varied overall lengths from their front ends to rear ends whereby said lock pins extend partially in said support and partially in said cylinder and lock said cylinder from rotating, and said locators being axially movable by a key having an end contour matched to said varied lengths such that when said key is applied to said locators in said keyway, it will push said lock pins out of said key cylinder and place the rear ends of said locators substantially flush with the rear end of said cylinder to unlock said cylinder for rotation by said key to said unlock position.

a first switch located on said support and having an operator member;

a switch actuator pin extending in said support in alignment with one of said lock pins and aligned with said operator member, said actuator pin being linearly movable into switch-operating engagement with said switch operator member by the lock pin aligned with said actuator pin when the said one lock pin has been pushed out of said key cylinder.

2. The lock of claim 1 wherein:

the inner end of said key cylinder in an arc at the radius of the actuator pin is substantially coplanar with the end of that locator operable on said one lock pin when said one lock pin is pushed out of said key cylinder, to thereby maintain operation of said switch as said cylinder is rotated from said lock position to said unlock position.

3. The lock of claim 1 and further comprising: a radially outwardly projecting lug on said key cylinder; a second switch secured to said housing, said second switch being operable by said lug when said cylinder is rotated to said unlock position.

4. A lock comprising:

a lock housing having a key opening in it;

a key cylinder received in said housing and rotatable on its cylindrical axis in said housing from a lock position to an unlock position, said cylinder having an axially-extending keyway therein facing said opening and extending from an outer end of said cylinder toward an inner end of said cylinder;

a support secured to said housing in alignment with the inner end of said cylinder;

a plurality of cylinder lock pins in said support and movable therein parallel to said axis;

pin-loading means in said support and urging said pins axially into pin-receiving apertures in said cylinder;

a plurality of lock locators in said apertures and seated in said cylinder and having front ends exposed in said keyway and rear ends supporting said lock pins against said urging, said locators being of varied overall lengths from their front ends to rear ends whereby said lock pins extend partially in said support and partially in said cylinder and lock said cylinder from rotating, and said locators being axially movable by a key having an end contour matched to said varied lengths such that when said key is applied to said locators in said keyway, it will push said lock pins out of said key cylinder and place the rear ends of said locators substantially flush with the rear end of said cylinder to unlock said cylinder for rotation by said key to said unlock position;

light inlet means in said housing;

light receiver means in said housing;

a switch;

a switch actuator in said support and cooperative with said switch; and light-responsive electrical conductor means in said receiver means;

a plurality of light-transmitting transverse passageways in said key cylinder registrable with said inlet means and with said conductor means when said cylinder is in said unlock position.

5. The lock of claim 4 and further comprising:

a key in said keyway, said key having an array of apertures and indentations corresponding to said passageways, and said key having an inner end having a contour matching the combination of lengths of said locators, for unlocking said lock pins and thereby unlocking said cylinder upon bottoming of said key in said cylinder keyway.

6. The lock of claim 5 wherein:

said key is elongated substantially rectangular and flat, and said array comprises three rows of five depressions and apertures each in a face of said key.

7. The lock of claim 4 and further comprising;

a radially outwardly projecting lug on said key cylinder;

a second switch secured to said housing, said second switch being operable by said lug when said cylinder is rotated to said unlock position;

a lamp associated with one of said switches and operable thereby;

logic gate means associated with said conductor means and responsive to light transmitted to said conductor means through said passageways from said inlet means to produce an output signal.

8. The lock of claim 7 and further comprising:

a plurality of light pipes conducting light from said lamp to said inlet means.

9. The lock of claim 8 and further comprising: an alarm coupled to an output of said gate means and operable to produce an alarm in response to said output signal.

10. The lock of claim 7 and further comprising: a utilization device coupled to said gate means and operable in response to operation of correct key rotating said cylinder from locked to unlocked position.

* * * * *